(12) United States Patent
Horasart et al.

(10) Patent No.: US 9,406,333 B1
(45) Date of Patent: Aug. 2, 2016

(54) DISK DRIVE HAVING A STATIONARY PLATE BETWEEN DISKS WITH GROOVES ADJACENT FASTENER HOLES

(71) Applicant: Western Digital Technologies, Inc., Irvine, CA (US)

(72) Inventors: Theerapong Horasart, Bangbuathong (TH); Meatasit Bupphasawan, Bangkok (TH); Chinorot Chaiboon, Mueng (TH)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/936,890

(22) Filed: Nov. 10, 2015

(51) Int. Cl.
  *G11B 17/02* (2006.01)
  *G11B 19/20* (2006.01)
  *G11B 17/028* (2006.01)

(52) U.S. Cl.
  CPC .......... *G11B 19/2045* (2013.01); *G11B 17/028* (2013.01)

(58) Field of Classification Search
  CPC ... G11B 17/02; G11B 17/028; G11B 17/0284
  USPC ................................ 360/99.12, 99.08, 99.06
  See application file for complete search history.

(56) References Cited

U.S. PATENT DOCUMENTS

| | | | |
|---|---|---|---|
| 5,134,530 A | 7/1992 | Hall | |
| 5,235,482 A | 8/1993 | Schmitz | |
| 6,046,889 A | 4/2000 | Berding et al. | |
| 6,052,890 A | 4/2000 | Malagrino, Jr. et al. | |
| 6,061,206 A | 5/2000 | Foisy et al. | |
| 6,097,568 A | 8/2000 | Ekhoff | |
| 6,101,876 A | 8/2000 | Brooks et al. | |
| 6,147,831 A | 11/2000 | Kennedy et al. | |
| 6,151,189 A | 11/2000 | Brooks | |
| 6,151,197 A | 11/2000 | Larson et al. | |
| 6,185,067 B1 | 2/2001 | Chamberlain | |
| 6,185,074 B1 | 2/2001 | Wang et al. | |
| 6,208,486 B1 | 3/2001 | Gustafson et al. | |
| 6,215,616 B1 | 4/2001 | Phan et al. | |
| 6,271,987 B1 | 8/2001 | Allsup et al. | |
| 6,272,694 B1 | 8/2001 | Knoth | |
| 6,288,866 B1 | 9/2001 | Butler et al. | |
| 6,292,333 B1 | 9/2001 | Blumentritt et al. | |
| 6,344,950 B1 | 2/2002 | Watson et al. | |
| 6,349,464 B1 | 2/2002 | Codilian et al. | |
| 6,388,873 B1 | 5/2002 | Brooks et al. | |
| 6,417,979 B1 | 7/2002 | Patton, III et al. | |
| 6,421,208 B1 | 7/2002 | Oveyssi | |
| 6,441,998 B1 | 8/2002 | Abrahamson | |
| 6,462,901 B1 | 10/2002 | Tadepalli | |
| 6,462,914 B1 | 10/2002 | Oveyssi et al. | |
| 6,466,398 B1 | 10/2002 | Butler et al. | |

(Continued)

*Primary Examiner* — Allen T Cao (57) ABSTRACT

A disk drive includes a disk drive base having a bottom surface, and a rotatable spindle. A first disk is mounted coaxially on the rotatable spindle, closer to the bottom surface than a second disk. A first stationary plate is affixed to the disk drive base by a plurality of fasteners, and extends between the first and second disks in an overlap region that spans at least 75 degrees of the circumference of each of the first and second disks. The first stationary plate includes a first plurality of fastener holes extending through the first stationary plate in a direction that is parallel to an axis of rotation of the spindle. The first stationary plate includes a first plurality of grooves that are elongated orthogonally to the axis of rotation and adjacent to corresponding ones of the first plurality of fastener holes.

17 Claims, 5 Drawing Sheets

(56) References Cited

U.S. PATENT DOCUMENTS

| | | |
|---|---|---|
| 6,469,871 B1 | 10/2002 | Wang |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,882,501 B2 | 4/2005 | Machcha et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,433 B2 | 8/2005 | Dahlenburg et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et al. |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |

(56) References Cited

U.S. PATENT DOCUMENTS

| | | |
|---|---|---|
| 7,283,324 B2 | 10/2007 | Sasaki |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 8,885,295 B2 * | 11/2014 | Le ................. G11B 17/0284 360/99.12 |
| 2002/0135933 A1 | 9/2002 | Harrison et al. |
| 2007/0133124 A1 * | 6/2007 | Kim ................. G11B 17/0287 360/99.12 |
| 2007/0242388 A1 * | 10/2007 | Goksel ............. G11B 17/0287 360/99.12 |
| 2011/0212281 A1 | 9/2011 | Jacoby et al. |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |
| 2014/0293484 A1 * | 10/2014 | Le ................. G11B 17/0284 360/99.12 |

* cited by examiner

DISK DRIVE HAVING A STATIONARY PLATE BETWEEN DISKS WITH GROOVES ADJACENT FASTENER HOLES

BACKGROUND

Disk drives are a type of information storage device that store information on one or more spinning disks. Other types of information storage devices include, for example, magnetic tape drives which retrieve stored information on magnetic tape (e.g. linear tape drive, helical scan tape drive). There are several types of disk drives. For example, there are so-called floppy disk drives, which store information on removable magnetic disks. There are also optical disk drives, which typically retrieve information stored on removable optical disk media. Magnetic hard disk drives typically store information on non-removable rigid magnetic disks. Also for example, there are magneto-optical disk drives, which share some of the characteristics of optical disk drives and magnetic hard disk drives.

All types of disk drives typically include a disk drive base, to which a spindle motor and head (or lens) actuator are affixed. The disk drive base may be cast of aluminum, for example to meet cost constraints. It is known in the art that it may be advantageous to include an arcuate shroud wall closely around the outer diameter of the disk(s), as a feature of the disk drive base, to reduce or attenuate dynamic excitation of certain disk drive components (e.g. disks, head stack assembly).

Another structure that may be included in a disk drive for this purpose, is a stationary plate fixed to the disk drive base and positioned partially between co-rotating disks, when the disk drive includes more than one disk. Such a stationary plate may sometimes be referred to as an "anti-disk" or a "disk damping plate." The anti-disk may be fabricated from stainless steel, for example to better control dimensions and to obtain adequate rigidity. In that case, and if the disk drive base is fabricated from aluminum, then there will be a mismatch in the coefficient of thermal expansion by the two structures.

The present inventors have experimentally determined that during temperature changes, for example when the disk drive starts operation and warms, the aforedescribed differential expansion may cause stress to build where the lowermost anti-disk is attached to the disk drive base. They have also learned that such differential expansion stress may be partially relieved by a sudden earthquake-like slippage between the attached parts (i.e. "popping events"), which can generate an undesirable shock wave or vibration in the disk drive. If that happens during the performance of data read or write operations by the disk drive, then consequent relative movement of disk drive internal parts (e.g. head stack assemblies) may result in read or write errors (e.g. off-track write). Such problem may become even more important in the future, as data track density (i.e. tracks per inch) on the disk is projected to increase.

Therefore, there is a need in the art for a disk drive having an improved anti-disk structure to reduce or prevent thermally induced shocks, and also having a cost that is acceptable for the high-volume manufacture of inexpensive disk drives.

DESCRIPTION OF THE PREFERRED EMBODIMENTS

Figure 1:
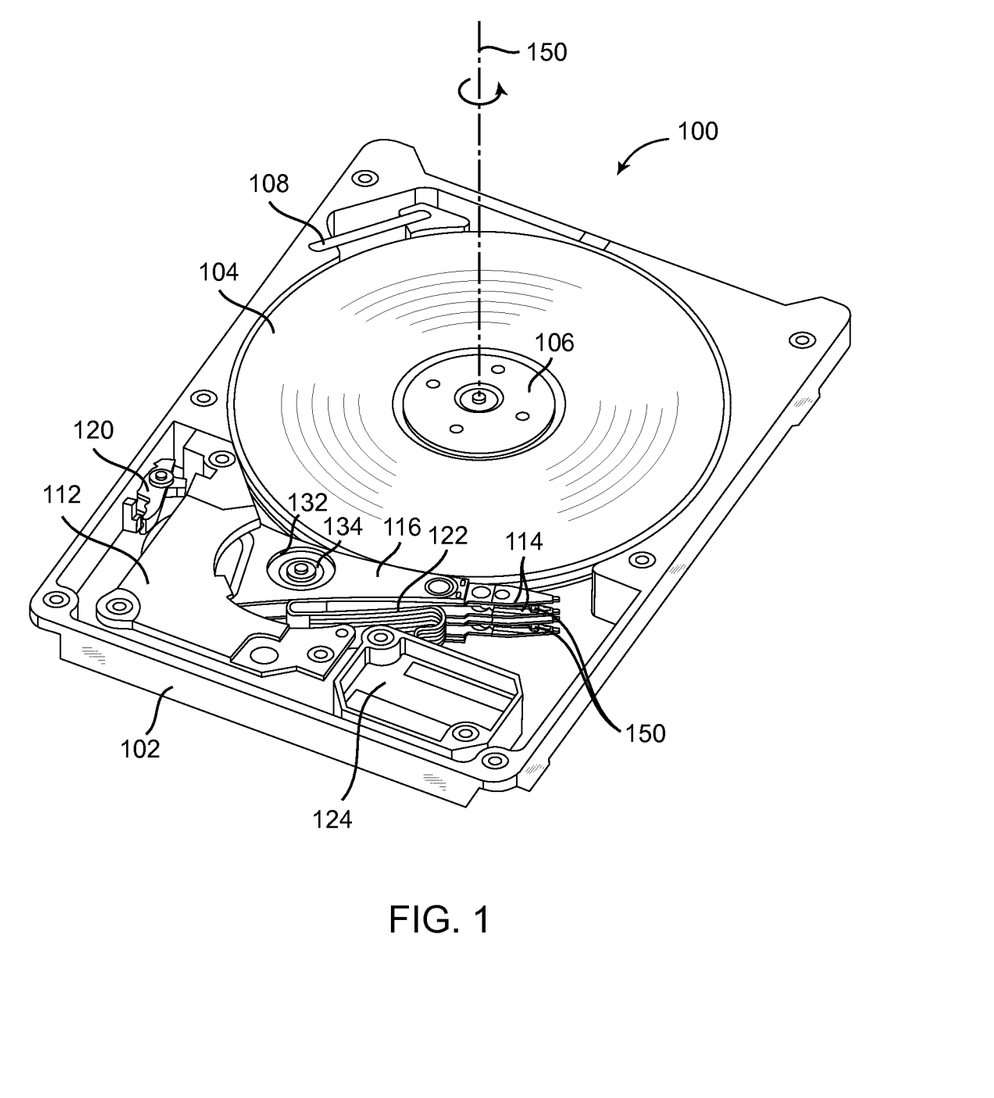
FIG. 1 is a top perspective view of a disk drive information storage device with the top cover removed to reveal internal components.

FIG. 1 is a top perspective view of a disk drive 100 with the top cover removed to reveal certain internal components. The disk drive 100 includes a disk drive base 102 and two annular magnetic disks 104. The disk drive 100 further includes a spindle 106, rotatably mounted on the disk drive base 102, for rotating the disks 104 about an axis of rotation 150. The rotation of the disks 104 establishes air flow through recirculation filter 108. In other embodiments, disk drive 100 may have only a single disk, or alternatively, three or more disks. Also, disk drives may be designed and manufactured in various sizes, known as "form factors". The example disk drive 100 shown in FIG. 1 is not intended to be limiting to any particular form factor; rather the improvements described herein may be applied to various form factors, including desktop form factors, enterprise or server form factors, and mobile device form factors.

A stationary plate (not visible in the view of FIG. 1) may be fixed to the disk drive base 102 and extend between the disks 104, for example to beneficially modify the air flow induced by disk rotation or assist in damping disk vibrations. For example, a so-called squeeze film of air may be established between the stationary plate and the disks 104, which can enhance the damping of disk vibrations. Such a stationary plate extending sufficiently between the disks to provide one or more of these beneficial effects may sometimes be referred to as a "disk damping plate" or an "anti-disk," and will be further described subsequently herein.

The disk drive 100 further includes an actuator 116 that may be pivotably mounted on disk drive base 102, for example by a pivot bearing 134 fit into a bore 132 in the body of the actuator 116. Voice coil motor 112 may pivot the actuator 116 through a limited angular range so that at least one head gimbal assembly (HGA) 114 is desirably positioned relative to one or more tracks of information on a corresponding one of the disks 104. In the embodiment of FIG. 1, the actuator 116 includes three arms upon which four HGAs 114 are attached, each corresponding to a surface of one of the two disks 104. However in other embodiments fewer or more HGAs 114 may be included depending on the number of disks 104 that are included and whether the disk drive 100 is depopulated.

Each HGA 114 preferably includes a head 150 for reading and writing from/to one of the disks 104. The head 150 may perform various functions and contain various microscopic structures such as a read transducer for reading data, a write transducer for writing data, a microactuator, a heater, a laser, a lapping guide, etc. The actuator 116 may occasionally be latched at an extreme angular position within the limited angular range, by latch 120. Electrical signals to/from the HGAs 114 are carried to other drive electronics via a flexible printed circuit (FPC) that includes a flex cable 122 (preferably including a preamplifier circuit) and flex cable bracket 124.

Figure 2:
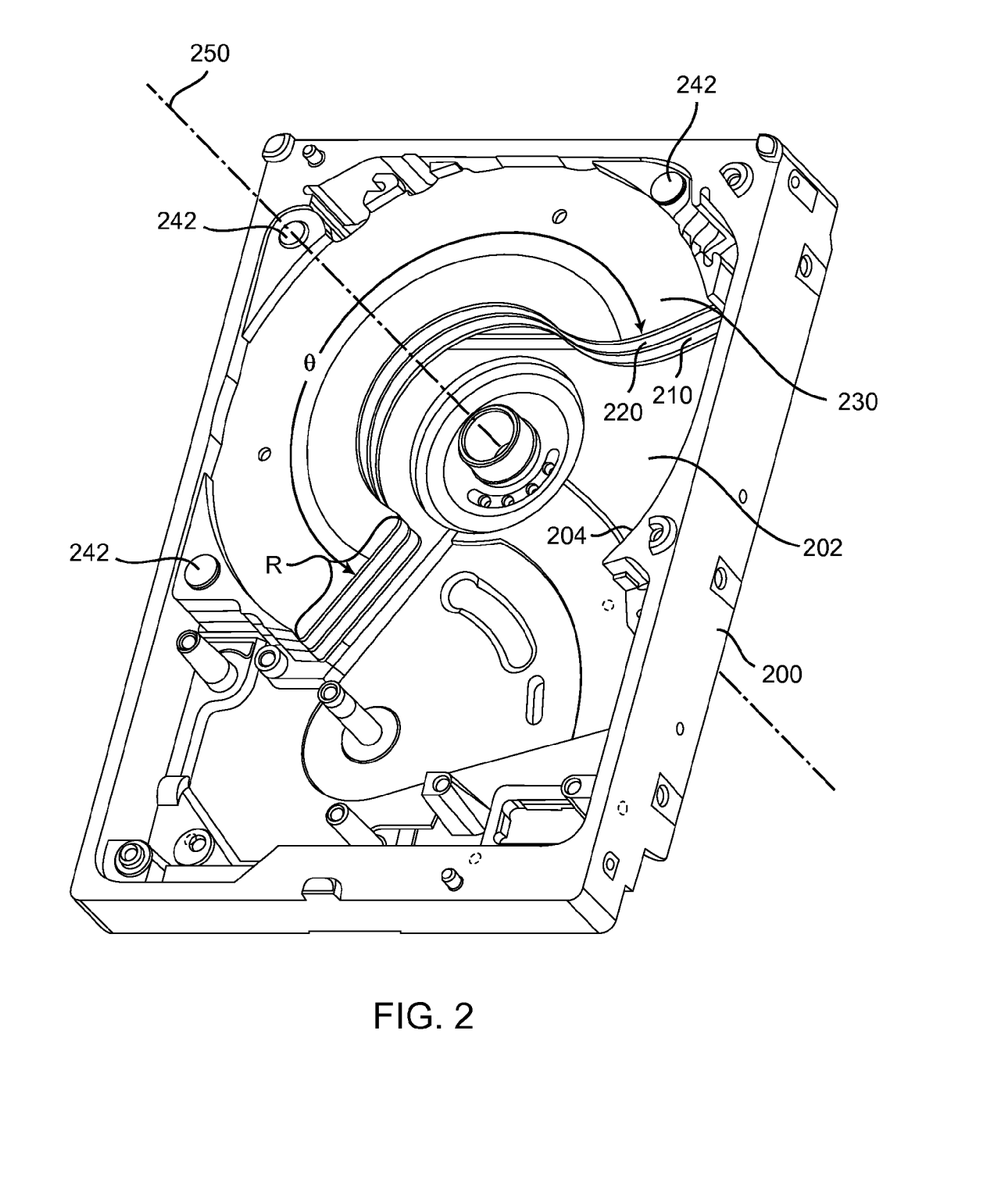
FIG. 2 is a top perspective view of a disk drive base component with a plurality of stationary plates affixed thereto.

FIG. 2 is a top perspective view of a disk drive base 200 with a plurality of stationary plates 210, 220, and 230 affixed thereto by three conventional fasteners 242 (e.g. screws). In the embodiment of FIG. 2, the disk drive base 200 optionally may be cast from aluminum, for example to limit or reduce manufacturing cost. By contrast, the stationary plates 210, 220, 230 optionally may be machined from stainless steel, for example to ensure adequate dimensional precision and rigidity.

Since the embodiment of FIG. 2 includes three stationary plates 210, 220, 230, it is intended to accommodate four co-rotating disks (disks similar to the disks 104 shown in FIG. 1). Similar co-rotating disks are not shown in FIG. 2, however, so that the stationary plates 210, 220, 230 can be seen. In the embodiment of FIG. 2, the disk drive base 200 also includes a planar area 202 that underlies the disk(s) and, after assembly, that is separated from but facing a major surface of a lowermost disk. In this context, "lowermost" means closest (measured in a direction parallel to the disk axis of rotation 250) to the planar area 202 of the disk drive base 200.

Note that in the embodiment of FIG. 2, the stationary plate 210 would extend between the lowermost disk and a second lowermost disk, the stationary plate 220 would extend between the second lowermost disk and a third lowermost disk, and the stationary plate 230 would extend between the third lowermost disk and a top disk. In this context, the "top" disk would be the disk disposed furthest (measured in a direction parallel to the disk axis of rotation 250) to the planar area 202 of the disk drive base 200. The disk drive base 200 optionally may also include an arcuate shroud wall 204, for example to beneficially modify the air flow induced by disk rotation about the disk axis of rotation 250.

In the embodiment of FIG. 2, each of the stationary plates 210, 220, 230 extends between corresponding co-rotating disks in an overlap region R that has an angular span θ of the disk circumference. For example, in certain embodiments the angular span θ of the overlap region R preferably may be at least 75 degrees of the disk circumference, for example so that the stationary plates 210, 220, 230 may adequately dampen disk vibrations or adequately affect the airflow induced by disk rotation.

Figure 3:
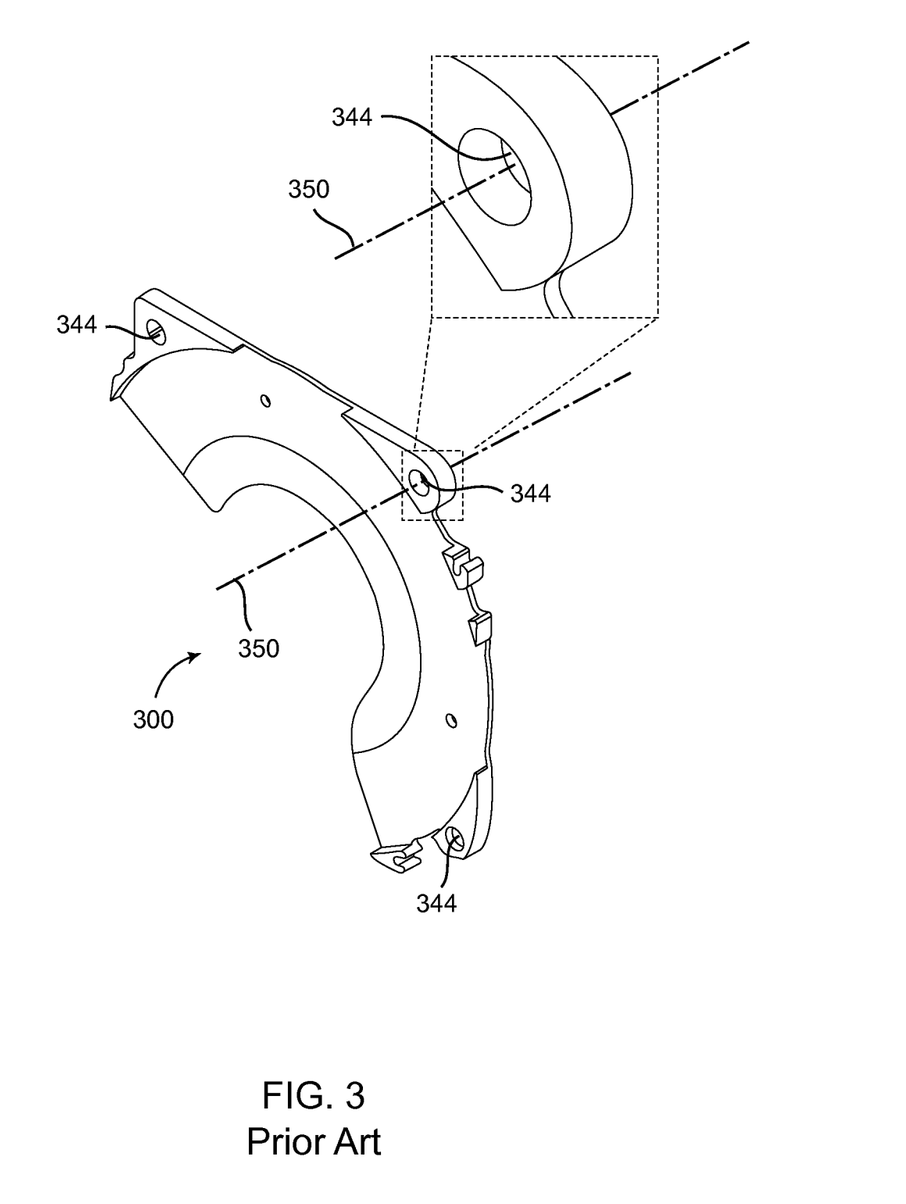
FIG. 3 depicts a stationary plate according to the prior art.

FIG. 3 depicts a stationary plate 300 that is suitable for use as an anti-disk or disk damping plate, according to the prior art. The stationary plate 300 includes three fastener holes 344 that extend through the stationary plate 300 in a direction 350, to facilitate attachment to a disk drive base.

Figure 4:
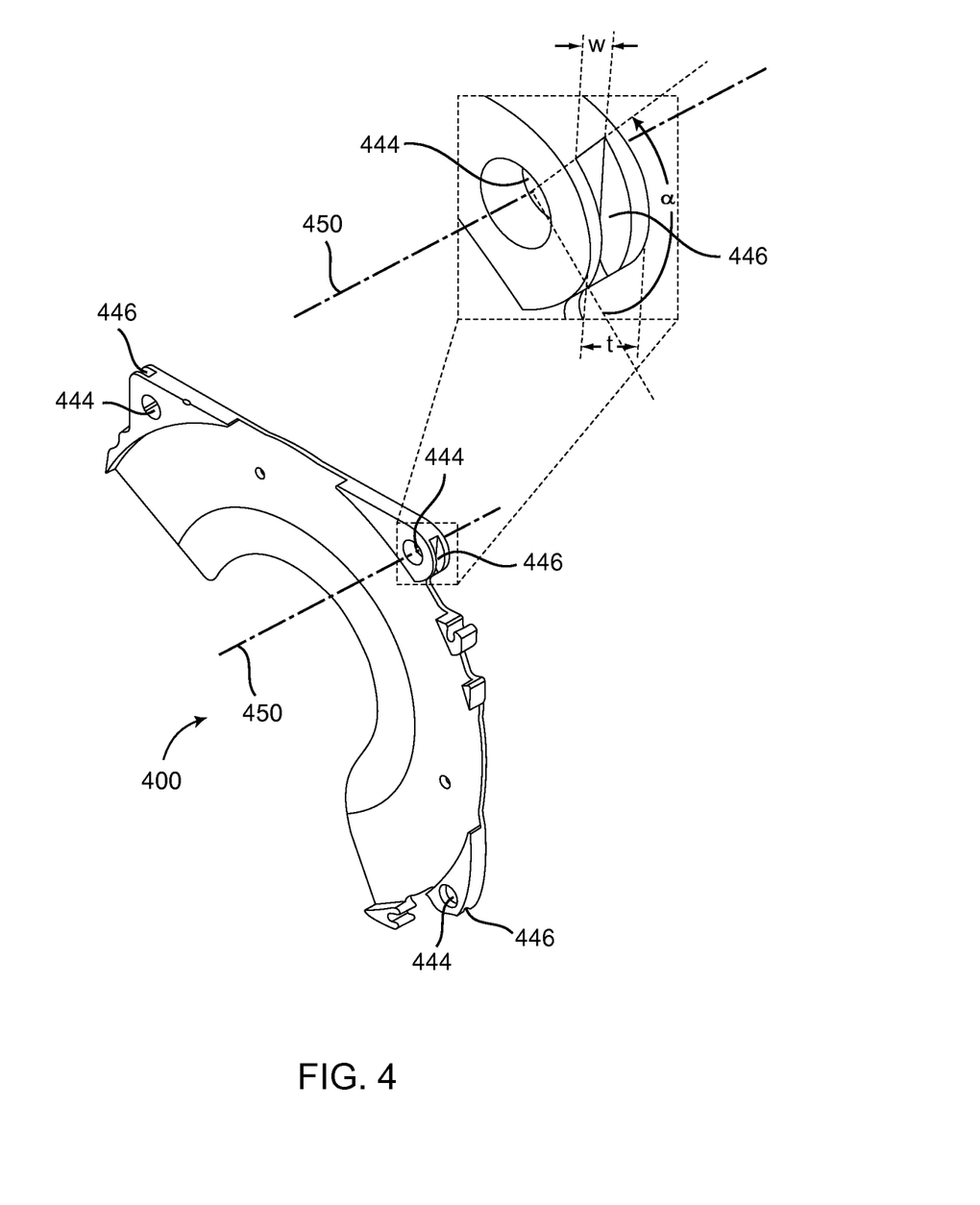
FIG. 4 depicts a stationary plate according to an example embodiment of the present invention.

FIG. 4 depicts a stationary plate 400 that is suitable for use as an anti-disk or disk damping plate, according to an example embodiment of the present invention. The stationary plate 400 includes a plurality of fastener holes 444 extending through the stationary plate 400 in a direction 450 that is parallel to the disk axis of rotation (e.g. axis of rotation 150 shown in FIG. 1). In this context, perfect parallelism is not required, but rather only approximate parallelism (e.g. ±10° of perfect parallelism). After disk drive assembly, a plurality of conventional fasteners extend through the plurality of fastener holes 444 to affix the stationary plate 400 to a disk drive base, as shown in FIG. 2.

Referring again to FIG. 4, the stationary plate 400 includes a plurality of grooves 446 that are elongated orthogonally to the direction 450. In this context, being elongated orthogonally to the direction 450 means mean longer than wide, with the longer dimension oriented approximately orthogonal to the direction 450. This does not require perfect orthogonality, but rather only approximate orthogonality (e.g. within ±20° of perfect orthogonality). In the embodiment of FIG. 4, each of the plurality of grooves 446 is shown to be disposed adjacent to a corresponding one of the plurality of fastener holes 444.

In the embodiment of FIG. 4, the stationary plate 400 defines a plate thickness t adjacent to one of the fastener holes 444 and measured in a direction parallel to the direction 450. In certain embodiments, the thickness t preferably may be in the range of 3 mm to 3.8 mm. In the embodiment of FIG. 4, each of the plurality of grooves 446 may define a groove width w that is measured in a direction parallel to the direction 450. In certain embodiments, the groove width w preferably may be in the range of 1 mm to 2 mm.

In certain embodiments, each of the plurality of grooves 446 may angularly span the corresponding and adjacent fastener hole 444 by a circumscribing angle α, e.g. measured about the direction 450, that is preferably in the range of 70° to 110°. In certain embodiments, each of the plurality of grooves 446 has a groove depth measured normal to direction 450 that preferably may be in the range of 1 mm to 2 mm. In certain embodiments, the plurality of grooves 446 and the foregoing dimensional ranges may serve to advantageously reduce or prevent thermally induced shocks in disk drives undergoing a substantial temperature change (e.g. warming after start).

In certain embodiments, the grooves 446 are included only on the lowermost stationary plate (e.g. stationary plate 210 of FIG. 2), but not on any upper stationary plates (e.g. stationary plates 220 and 230 of FIG. 2), to reduce manufacturing cost. In certain embodiments, this cost reducing alternative may be practically acceptable because thermal stresses (e.g. due to differential thermal expansion) may be more severe for the lowermost stationary plate 210 and less severe for the upper stationary plates 220 and 230. In certain other embodiments, for example in embodiments where thermal stresses have greater extent, or where it may be practically desired to commercially inventory fewer component types, one or both of the upper stationary plates 220 and 230 may also include grooves like the grooves 446 of FIG. 4.

Figure 5:
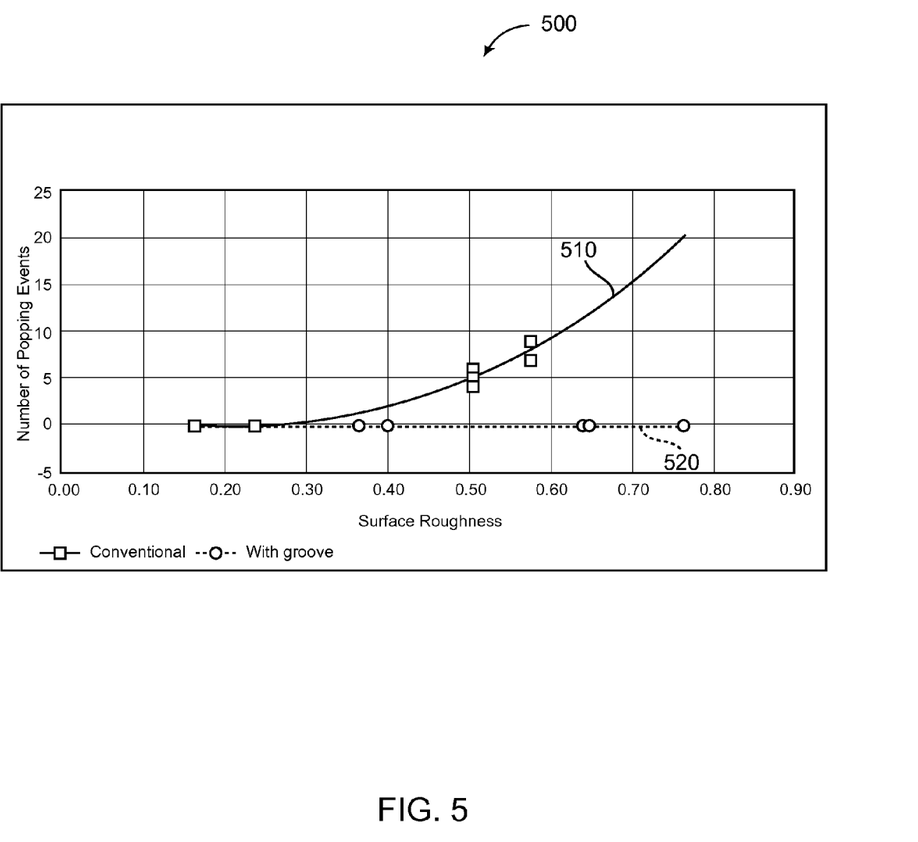
FIG. 5 is a graph demonstrating an advantage of one example embodiment of the present invention.

FIG. 5 is a graph 500 demonstrating a potential advantage of one example embodiment of the present invention. In the graph 500, the data plot 510 demonstrates that the number of undesirable popping events can increase with surface roughness for a conventional anti-disk, but may not for an anti-disk that includes grooves like the grooves 446 of FIG. 4. Since popping events can generate an undesirable shock wave or vibration in the disk drive, the performance of data read or write operations may be improved and read or write errors (e.g. off-track write) reduced if popping events are reduced or avoided. For at least this reason, the novel features disclosed and claimed herein may have substantial importance presently, and could gain even more importance in the future, as data track density (i.e. tracks per inch) on the disk is projected to increase.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," "with," and "having," as used herein, are intended to be read as open-ended terms.

We claim:

1. A disk drive comprising:
   a disk drive base having a bottom surface;
   a spindle attached to the disk drive base, the spindle defining an axis of rotation normal to the bottom surface;
   a first disk and a second disk mounted coaxially on the spindle, the first disk disposed closer to the bottom surface than the second disk; and a first stationary plate affixed to the disk drive base by a plurality of fasteners, the first stationary plate extending between the first and second disks in an overlap region that spans at least 75 degrees of the circumference of each of the first and second disks;

wherein the first stationary plate includes a first plurality of fastener holes, each of the first plurality of fastener holes extending through the first stationary plate in a direction that is parallel to the axis of rotation; and wherein the plurality of fasteners extends through the first plurality of fastener holes; and wherein the first stationary plate includes a first plurality of grooves that are elongated orthogonally to the axis of rotation, each of the first plurality of grooves being adjacent to a corresponding one of the first plurality of fastener holes.

2. The disk drive of claim 1 wherein each of the plurality of fasteners is a screw fastener.

3. The disk drive of claim 1 wherein each of the first plurality of grooves angularly spans the corresponding one of the first plurality of fastener holes by a circumscribing angle of at least 70 degrees but no more than 110 degrees.

4. The disk drive of claim 1 wherein the first plurality of fastener holes consists of three fastener holes and the first plurality of grooves consists of three grooves.

5. The disk drive of claim 1 further comprising:
a third disk mounted on the spindle, the third disk disposed further from the bottom surface than the first disk and the second disk; and
a second stationary plate affixed to the disk drive base by the plurality of fasteners, the second stationary plate extending between the second and third disks and including a second plurality of fastener holes, each of the second plurality of fastener holes extending through the second stationary plate in a direction that is parallel to the axis of rotation;
wherein the second plurality of fastener holes are in alignment with the first plurality of fastener holes, and the plurality of fasteners extends through the second plurality of fastener holes.

6. The disk drive of claim 5 wherein the second stationary plate is not grooved adjacent each of the second plurality of fastener holes.

7. The disk drive of claim 5 wherein the second stationary plate includes a second plurality of grooves that are elongated orthogonally to the axis of rotation, each of the second plurality of grooves being adjacent to a corresponding one of the second plurality of fastener holes.

8. The disk drive of claim 7 wherein each of the second plurality of grooves angularly spans the corresponding one of the second plurality of fastener holes by a circumscribing angle of at least 70 degrees but no more than 110 degrees.

9. The disk drive of claim 1 wherein the disk drive base comprises aluminum and the first stationary plate comprises stainless steel.

10. The disk drive of claim 1 wherein the first stationary plate defines a plate thickness measured parallel to the axis of rotation in the range of 3 mm to 3.8 mm and each of the first plurality of grooves defines a groove width measured parallel to the axis of rotation in the range of 1 mm to 2 mm.

11. The disk drive of claim 1 wherein each of the first plurality of grooves has a groove depth measured normal to the axis of rotation in the range of 1 mm to 2 mm.

12. The disk drive of claim 5 further comprising:
a fourth disk mounted on the spindle, the fourth disk disposed further from the bottom surface than the first disk and the second disk and the third disk; and
a third stationary plate affixed to the disk drive base by the plurality of fasteners, the third stationary plate extending between the third and fourth disks and including a third plurality of fastener holes, each of the third plurality of fastener holes extending through the third stationary plate in a direction that is parallel to the axis of rotation;
wherein the third plurality of fastener holes are in alignment with the first plurality of fastener holes and the second plurality of fastener holes, and the plurality of fasteners extends through the third plurality of fastener holes.

13. The disk drive of claim 12 wherein the third stationary plate is not grooved adjacent each of the third plurality of fastener holes.

14. The disk drive of claim 12 wherein the third stationary plate includes a third plurality of grooves that are elongated orthogonally to the axis of rotation, each of the third plurality of grooves being adjacent to a corresponding one of the third plurality of fastener holes.

15. The disk drive of claim 14 wherein each of the third plurality of grooves angularly spans the corresponding one of the third plurality of fastener holes by a circumscribing angle of at least 70 degrees but no more than 110 degrees.

16. The disk drive of claim 5 wherein the first and second stationary plates comprise stainless steel, and the disk drive base comprises aluminum.

17. The disk drive of claim 12 wherein the first, second, and third stationary plates comprise stainless steel, and the disk drive base comprises aluminum.

* * * * *